No. 695,079. Patented Mar. 11, 1902.
W. A. PIERCE.
HAY ELEVATOR AND DISTRIBUTER.
(Application filed May 22, 1901.)
(No Model.)
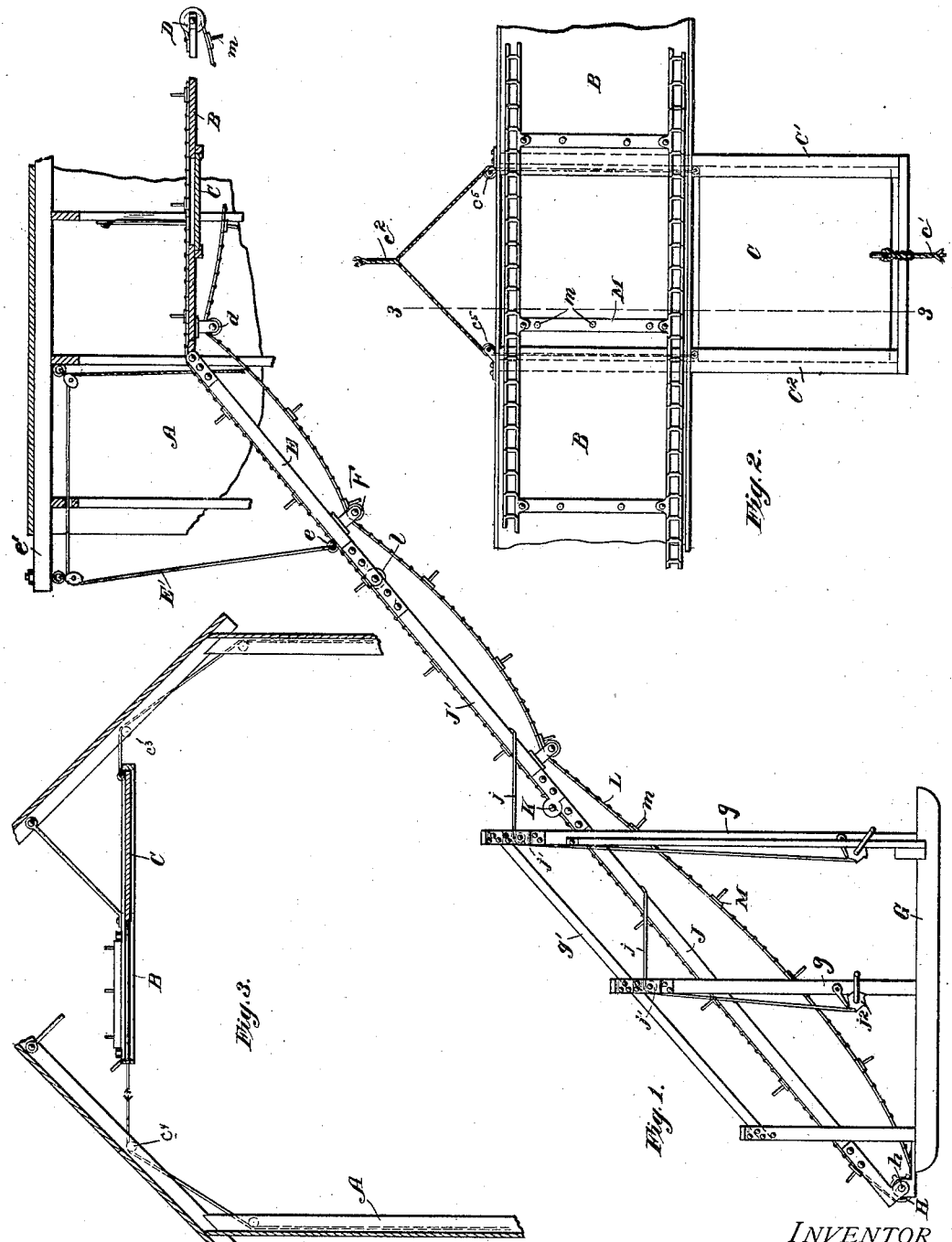
WITNESSES:
INVENTOR
William A. Pierce
BY
Attorney

United States Patent Office.

WILLIAM A. PIERCE, OF TOPEKA, KANSAS.

HAY ELEVATOR AND DISTRIBUTER.

SPECIFICATION forming part of Letters Patent No. 695,079, dated March 11, 1902.

Application filed May 22, 1901. Serial No. 61,407. (No model.)

*To all whom it may concern:*

Be it known that I, WILLIAM A. PIERCE, a citizen of the United States, residing at Topeka, in the county of Shawnee and State of Kansas, have invented certain new and useful Improvements in Hay Elevators and Distributers; and I do hereby declare the following to be a full, clear, and exact description of the invention, such as will enable others skilled in the art to which it appertains to make and use the same.

This invention relates to an improvement in hay elevators and distributers, and is designed for the purpose of transporting hay, straw, or grain from a position at or near the ground into a barn or storage-building; and the invention is embodied in the construction and arrangement of parts presently to be described, and defined in the claims.

While I have shown a simple and convenient construction of apparatus for performing the work above indicated, it is of course to be understood that the invention is not limited to the minute details, and various changes can be made without departing from the nature and principle of the invention.

Heretofore it has been customary to mount in a barn or shed a fixed track, and hay has been grappled and carried by suitable mechanism up the track and dropped at a convenient point in the barn. This necessitates, first, the grappling of the hay; second, the elevating; third, the dumping, and, fourth, the necessary drawing back of the grapple. My invention is designed to overcome these four steps, in that the same acts continuously from a given source of power and so in one direction, and in constructing the apparatus I employ the endless-belt-principle carrier. In the patent to Alfonso Buchey, No. 645,996, of March 27, 1900, a hay-stacker is shown, an apparatus which has proved successful and which elevates the hay from the ground to a stack. In such apparatus said endless carrier is shown, and in this connection I employ a construction somewhat similar to the Buchey stacker, associating therewith other features, which renders the same useful in connection with carrying and distributing hay in a barn or shed.

In the drawings I have shown in Figure 1 an elevation of the apparatus, parts being broken away; in Fig. 2, a plan of the upper portion of the platform; in Fig. 3, a sectional view of one of the traps, taken on line 3 3 of Fig. 2.

A designates the barn or shed, in the upper portion of which is secured by suitable braces a platform B, the same running longitudinally for any desired distance through the top of the barn. This platform is of particularly light construction and is provided with a series of traps or doors C, slidingly mounted at the edges in ways $C'$ $C^2$ and designed to be open transversely, thus disclosing an opening in the platform. These doors are moved by suitable ropes $c'$ $c^2$, extending over pulleys $c^3$ and $c^4$ at the top of the barn, the rope $c^2$ being branched and passing along the guideways over pulleys $c^5$ on the guides. The guides on one side extend beyond the platform, thus forming carriers for the doors when moved out.

At the end of the platform B are sprocket-wheels D, and below the platform at suitable intervals are idlers $d$, carried by suitable brackets supported from the platform. These pulleys and idlers are located at the sides of the platform, for purposes presently to be stated. Hinged to the forward edge of the platform B is an inclined platform E, extending to the outside of the barn. This platform is held in an inclined position by a rope or cable $E'$, connected with suitable eyebolts $e$ on the platform in any convenient manner, and with a projecting beam or bracket $e'$ on the barn. This inclined portion may, however, be supported in any desirable manner. By the above construction the inclination may be changed by varying the length of the cable $E'$. On the under side of the inclined platform are idler-pulleys F.

G designates a supporting-base, having suitable uprights $g$ thereon, which are connected at their upper ends by inclined beams $g'$. To the outer end of the base G is a driving mechanism H, consisting of a sprocket-wheel mounted on the shaft $h$, which may be driven by any suitable power, such as horse-power. (Not shown.) In the frame between the uprights $g$ is an inclined table or platform J, which is adjustable vertically through suitable ropes $j$, passing over pulleys $j'$ on the uprights and down along the same to suitable drums $j^2$, the ends of the ropes being connected to the platform. This platform J is conveniently made in two sections, hinged at K, so that the upper portion J' may be inclined relative to the lower section by adjusting the rope or support therefor. The upper portion of the section J' is movably connected to the lower end of the platform E and forms a continuation thereof, the connection being made by a suitable clip or bracket. Idlers are secured to the platform J at intervals.

Passing over the sprocket-wheels H are endless sprocket-chains L, the same passing over the pulleys $l$, located at a point between the sections J' and E of the platform, and thence up over sprockets D D and then back over the various idlers below the platform. These sprocket-chains are located on opposite sides of the platform. They are united by cross-pieces M, which are spaced widely apart and which are each provided with teeth or pins $m$ for engaging the material.

By the above-described construction it will be observed that by placing hay on the lower end of the platform J and giving a continuous movement to the carrier and the cross-pieces traveling on the smooth platforms the hay will be carried up the inclination and on the platform B in the top of the barn and will be carried over the end of the platform B, or, as the occasion may demand, may be dropped through the traps or openings in the platform B and thence deposited in the barn. It will be noticed that provision has been made for the proper adjustment of the platforms, especially the sections E and J', so that the inclination between the stationary platform on the top of the barn and the inclined platform may be varied at will to suit the height of the barn into which the hay is to be carried.

Numerous details in the construction and changes may be made without in the least departing from the invention.

Having thus described the invention, what is claimed as new, and desired to be secured by Letters Patent, is—

1. In an apparatus for elevating hay into buildings, the combination of a horizontal platform permanently secured to the upper part of the building and wholly contained therein, a portable inclined platform located without the building with its upper end in proximity to an opening in the building, a platform-section permanently secured to the stationary platform by a pivotal connection, whereby it may be moved to a position entirely within the building, or to extend outward through the opening therein into operative association with the inclined platform, a single endless carrier adapted to traverse all of said platforms from end to end when in operative position, and means for actuating said carrier, substantially as described.

2. In an apparatus for elevating material into buildings, the combination of a horizontal platform permanently secured in the upper part of the building and wholly contained therein, a platform-section hinged to one end of the stationary platform adjacent to an opening in the building, and capable of being freely moved to a position wholly within the building or to extend out through said opening therein, a movable inclined platform without said building, means for connecting the end of said inclined platform with the free end of the hinged platform-section, an endless carrier traversing all of said platforms when so connected and returning therebeneath through the aforesaid opening in the building, means for operating said carrier, and a series of independently-operable discharge-traps in the stationary platform; substantially as described.

In testimony whereof I affix my signature in presence of two witnesses.

WILLIAM A. PIERCE.

Witnesses:
LOUIS W. WILSON,
BENNETT A. WHEELER.